United States Patent

Högberg et al.

[11] Patent Number: 4,655,670
[45] Date of Patent: Apr. 7, 1987

[54] TRANSPORTATION DEVICE

[76] Inventors: Kjell T. Högberg, Skillingvägen 5, S-902 50 Umeå; K. Torsten Forsberg, Skillbergsgatan 9, S-124 45 Bandhagen, both of Sweden

[21] Appl. No.: 671,895

[22] Filed: Nov. 15, 1984

[30] Foreign Application Priority Data

Nov. 17, 1983 [SE] Sweden ............................ 8306344

[51] Int. Cl.$^4$ .................................. B60P 3/00
[52] U.S. Cl. ............................ 414/458; 414/426; 414/911
[58] Field of Search ............... 414/426, 429, 458, 459, 414/911, 24.5, 525 R, 539; 180/7.1

[56] References Cited

U.S. PATENT DOCUMENTS

| 2,380,415 | 7/1945 | Carruthers | 414/429 |
| 2,452,481 | 10/1948 | Morehead et al. | 414/911 X |
| 2,505,352 | 4/1950 | Dillon | 414/429 |
| 2,538,473 | 1/1951 | Russell et al. | 414/426 |
| 3,529,736 | 9/1970 | Lebre | 414/458 |
| 4,240,773 | 12/1980 | Terry | 414/911 X |
| 4,375,244 | 3/1983 | Morin | 414/429 X |
| 4,411,329 | 10/1983 | Stedman | 180/7.1 |

FOREIGN PATENT DOCUMENTS

| 363781 | 2/1974 | Sweden | 180/7.1 |
| 414294 | 7/1980 | Sweden | 180/7.1 |
| 2066206 | 7/1981 | United Kingdom | 414/426 |

Primary Examiner—Joseph E. Valenza
Assistant Examiner—David A. Bucci
Attorney, Agent, or Firm—Tarolli, Sundheim & Covell

[57] ABSTRACT

A transportation device comprising two longitudinally extending frame parts adjustable relative to each other in a transverse direction, individually driven drive means for each of said longitudinally extending frame parts and having obliquely positioned ground contact elements for driving the device in an optimal direction, each of said drive means comprising at least one drive wheel disposed on the frame part for moving the frame part relative to the other frame part, and displacing means for displacing at least one of the first and second frame parts relative to each other in the transverse direction.

14 Claims, 13 Drawing Figures

TRANSPORTATION DEVICE

This invention relates to a transportation device having at least one frame part which is adjustable in relation to another frame part of the transportation device, said device comprising individually driven drive wheels, endless tracks or the like with obliquely positioned ground contact elements such that the transportation device can be driven in an optional direction.

The object of the invention is to permit exploiting a transportation device of the type described in an optimum manner with regard to its maneuverability and its adaptability to loads of various widths. This is realized mainly with the aid of the characteristic features defined by the apparent claims.

The invention will be elucidated more in detail below with reference to the accompanying drawings in which.

In the drawings there is shown a transportation device 1 for the pick-up and transportation of cable drums 2. The transportation device 1 or "carrier", as such a device is termed in the art, has two longitudinal frame parts 3 and 4 which are interconnected via a transverse frame part 5. Each longitudinal frame part 3 and 4, respectively, has a front truck unit 6 and 7, respectively, and a rear truck unit 8 and 9, respectively. The front truck units 6, 7 are adapted to pivot about truck journals axes 10 and 11, respectively, which coincide with the axis 12 of the transverse frame part 5. The front truck units 6, 7 are equipped with drive wheels 13 and 14, respectively, disposed on one side of the truck journals axes 10, 11 and driven by drives 15 and 16, respectively, while casters 17a and 17b respectivly, are arranged on the other side of the truck journals axes 10, 11. The rear truck units 8, 9 are pivotally mounted on swing arms 18 and 19, respectively, about pivot pins 20 and 21, respectively, and the swing arms 18, 19 in turn are pivotally mounted in the longitudinal frame parts 3, 4 via truck journals axes 22 and 23, respectively. The rear truck units 8, 9 have drive wheels 24 and 25, respectively, disposed on one side of the truck journals axes 22, 23 and driven by drives 26 and 27, respectively, while casters 28, 29 are arranged on the other side of the truck journals axes 22, 23. Between the longitudinal frame parts 3, 4 and those parts of the rear truck units 8, 9 beneath which the casters 28, 29 are situated, there are disposed load distribution means 28a and 29a, respectively, which distribute the load from the two longitudinal frame parts 3, 4 such that the carrier is enabled to pass over uneven ground with retained ground contact and retained load on the respective truck units. Each load distribution means 28a, 29a preferably consists of a bellows cylinder 30 and 31, respectively, to allow the truck units 8, 9 to perform individual swinging movements about their pivot pins on the swing arms 18, 19.

Figure 7:
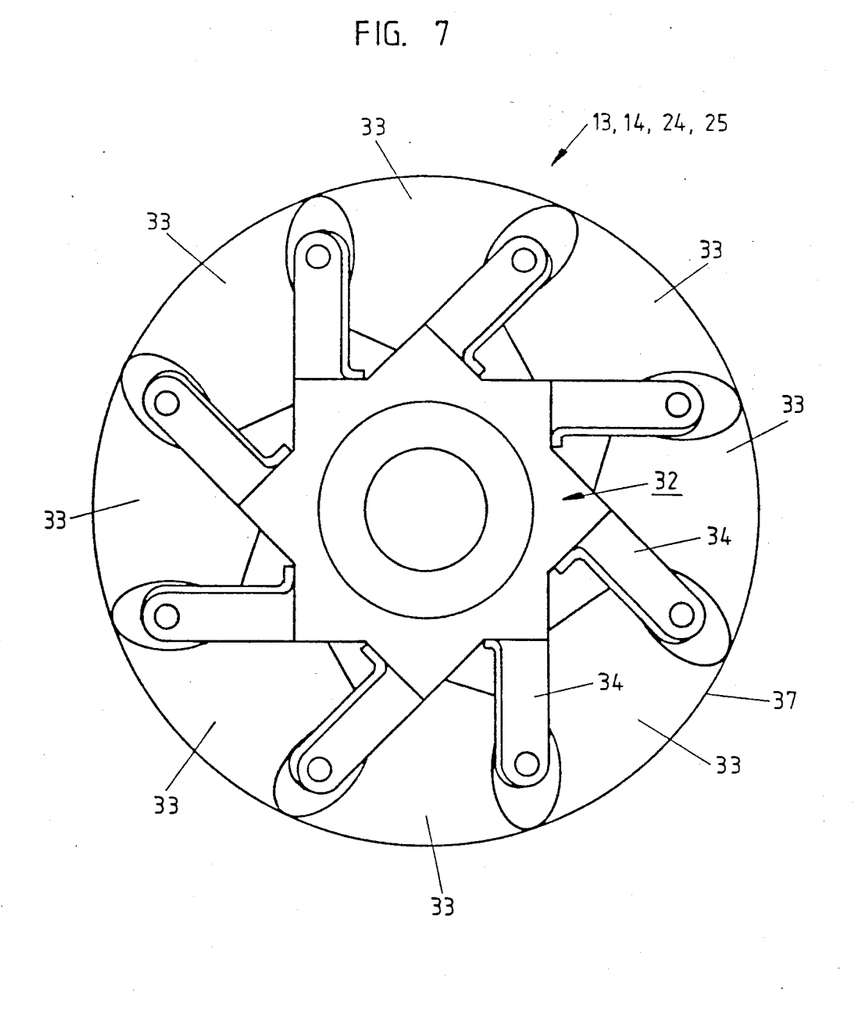
FIG. 7 is a side view of a wheel of the transportation device.
Figure 8:
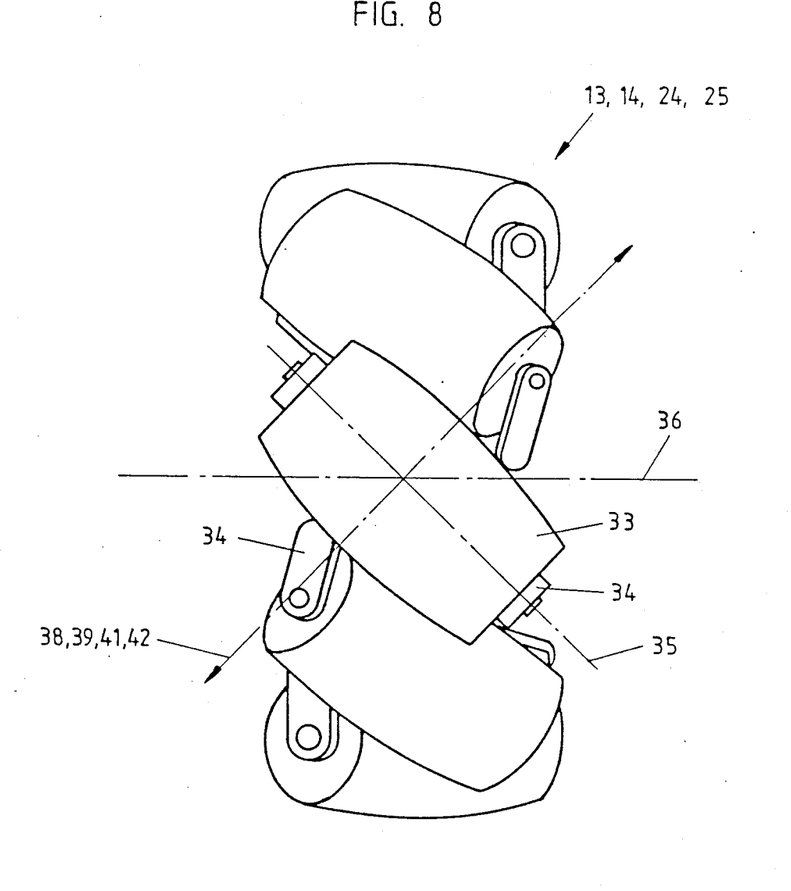
FIG. 8 is a front view of the wheel shown in FIG. 7.

The drive wheels 13, 14, 24, 25 are shown in detail in FIGS. 7 and 8. As will be seen from these Figs., each drive wheel 13, 14, 24, 25 has a driven wheel body 32 and rollers 33 distributed about said body. The wheel body 32 has two flange means 34 for each roller 33 which is disposed between the flange means 34 and mounted for rotation therein. Each pair of flange means 34 is so adapted that the axes of rotation 35 of the rollers 33 extend obliquely in relation to the axis of rotation 36 of the wheel body 32, and furthermore each roller 33 is so dimensioned and has such a spool shape that the rollers 33 together constitute a continuous wheel periphery 37 about the wheel body 32, when the latter is seen from the side.

Figure 9:
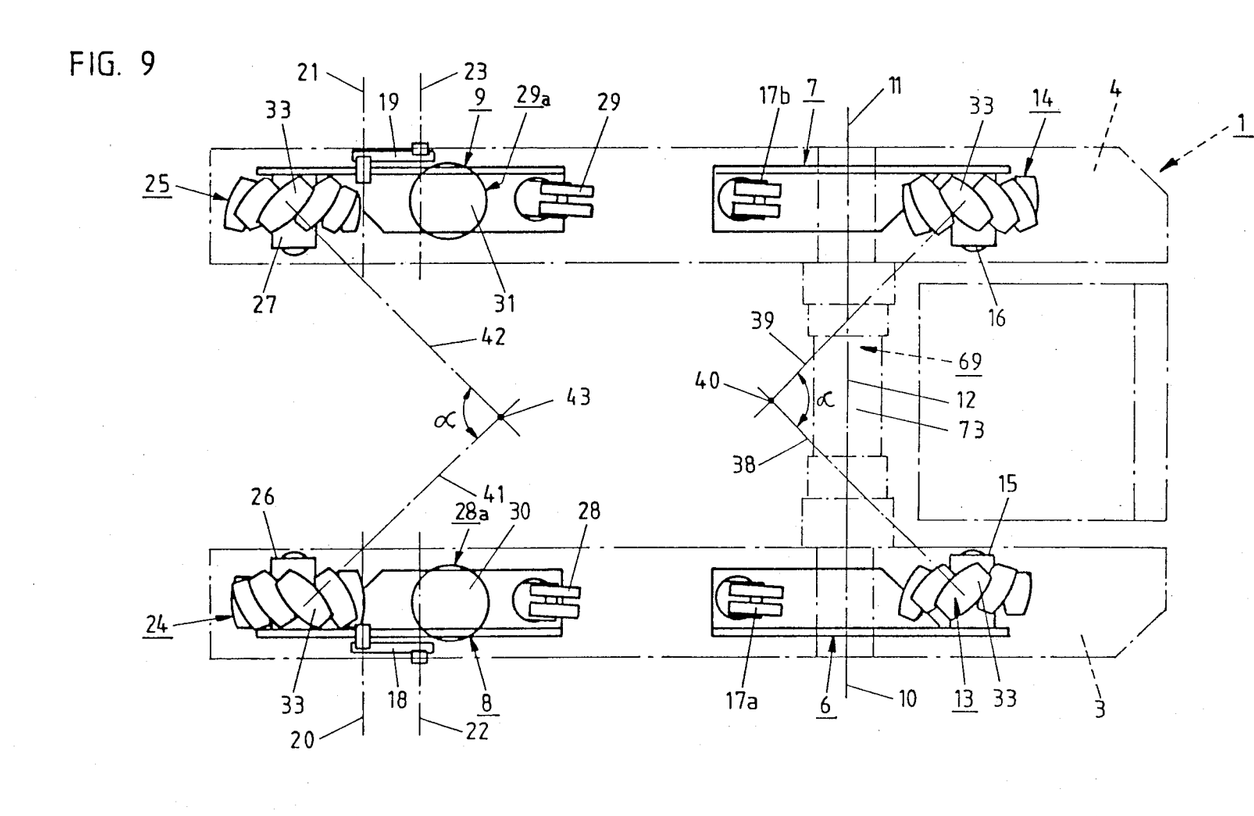
FIG. 9 is a diagrammatic bottom plan view showing the rolling direction of rollers mounted on the wheels of the transportation device.

The drive wheels 13, 14 are so arranged that the lines 38, 39 of their rolling directions, which are perpendicular to the axes of rotation 35, converge in the direction away the transverse frame part 5 and intersect at a point 40 between the longitudinal frame parts 3, 4 at an angle of 45° (or at another suitable angle). The wheels 24 and 25 are so arranged that the lines 41, 42 of their rolling directions, which are perpendicular to the axes of rotation 35, converge in the direction towards from the transverse frame part 5 and intersect at a point 43 between the longitudinal frame parts 3, 4 at an angle of 45° (or at another suitable angle). By this design and disposition of the drive wheels 13, 14, 24, 25 and because each drive wheel 13, 14, 24, 25 is individually driven (for instance with the aid of drives 15, 16, 26, 27 in the form of hydraulic motors) the carrier can be moved in an optional direction and swung in an optional manner. For an explanation of this and a more detailed account of the type of drive wheels in question, reference is made to Swedish patent specifications Nos. 363,781 (Patent Application 16864/70) and 7314550-0 (Publication No. 414,294).

To lift and transport the cable drum 2 the carrier 1 is provided with a lifting assembly 44. This assembly 44 has four lifting means 45, 46, 47 and 48. Of these, two front lifting means 45, 46 are arranged on the transverse frame part 5 and two rear lifting means 47, 48 are so arranged on the longitudinal frame parts 3 and 4 that their distance to the front lifting means 45, 46 can be varied. The front lifting means 45, 46 have lifting surfaces 49, 50 directed upwardly and towards the rear lifting means 47, 48, while the rear lifting means 47, 48 have lifting surfaces 51, 52 directed upwardly and towards the front lifting means 45, 46. Said lifting surfaces 49–52 are adapted to cooperate with engagement surfaces 53–56 on the opposite sides of the two end walls 57, 58 of the cable drum 2, said engagement surfaces being directed downwardly and facing away from one another. The engagement surfaces 53–56 are formed by lower portions 53, 54 of the periphery 59 of the end wall 57 and by lower portions 55, 56 of the periphery 60 of the end wall 58. A cable drum 2 placed between the front lifting means 45, 46 and the rear lifting means 47, 48 is lifted in that the rear lifting means 47, 48 are moved towards the front lifting means 45, 46 until the lifting surfaces 51, 52 of the rear lifting means 47, 48 bear against the engagement surfaces 54, 56 of the cable drum 2 and the lifting surfaces 49, 50 of the front lifting means 45, 46 bear against the engagement surfaces 53, 55. At the continued movement of the rear lifting means 47, 48 the front lifting means 45, 46 will prevent a forward movement of the cable drum 2 so that the forwardly directed pressure by which the rear lifting means 47, 48 lift the cable drum 2, will result in the cable drum 2 being urged upwardly from the ground or base until it occupies a fully raised position. The lifting power is brought about because of the oblique positions taken by the lifting surfaces 49, 50, 51 and 52 and the engagement surfaces 53, 54, 55 and 56 in relation to the lifting power. The positions taken by the cable drum 2 and the rear lifting means 47, 48 before lifting is performed have been indicated by dash and dot lines in FIG. 2, while the positions of the cable drum 2 and the rear lifting means 47, 48, after the cable drum 2 has been raised from the base, are indicated by full lines in said Figure.

To give the carrier 1 a low overall height the rear lifting means 47, 48 are linearly movable along the longitudinal frame parts 3, 4. This movement is realized with the aid of cylinder and piston units 61, 62 which have been built into the frame parts 3, 4 and on which the lifting means 47, 48 are so arranged as to be moved in the longitudinal direction of the frame parts 3, 4 when the cylinder and piston units 61, 62 contract or vice versa.

To permit insertion of the rear lifting means 47, 48 behind the end walls 57, 58 of the cable drum said lifting means 47, 48 present movable elements 63, 64 in the form of pins which are provided with the lifting surfaces 51, 52. The elements 63, 64 are mounted in sleeves 65, 66 on the cylinder and piston units 61, 62 so that they can be moved in transverse directions in relation to the linear movement of the cylinder and piston units 61, 62 along the longitudinal frame parts 3, 4.

To faciliate the lifting operation the lifting means 45, 46 on the transverse frame part are provided with elements 67, 68 which present cylindrical lifting surfaces 49, 50 and are pivotally mounted such that said elements 67, 68 can turn on the transverse frame part 5 when the cable drum 2 weights the element 67, 68 in their directions of rotation. The pin-like elements 63, 64 of the rear lifting means 47, 48 are non-rotatably mounted in the sleeves 65, 66 and they are provided with planar or irregular lifting surfaces 51, 52.

Figure 1:
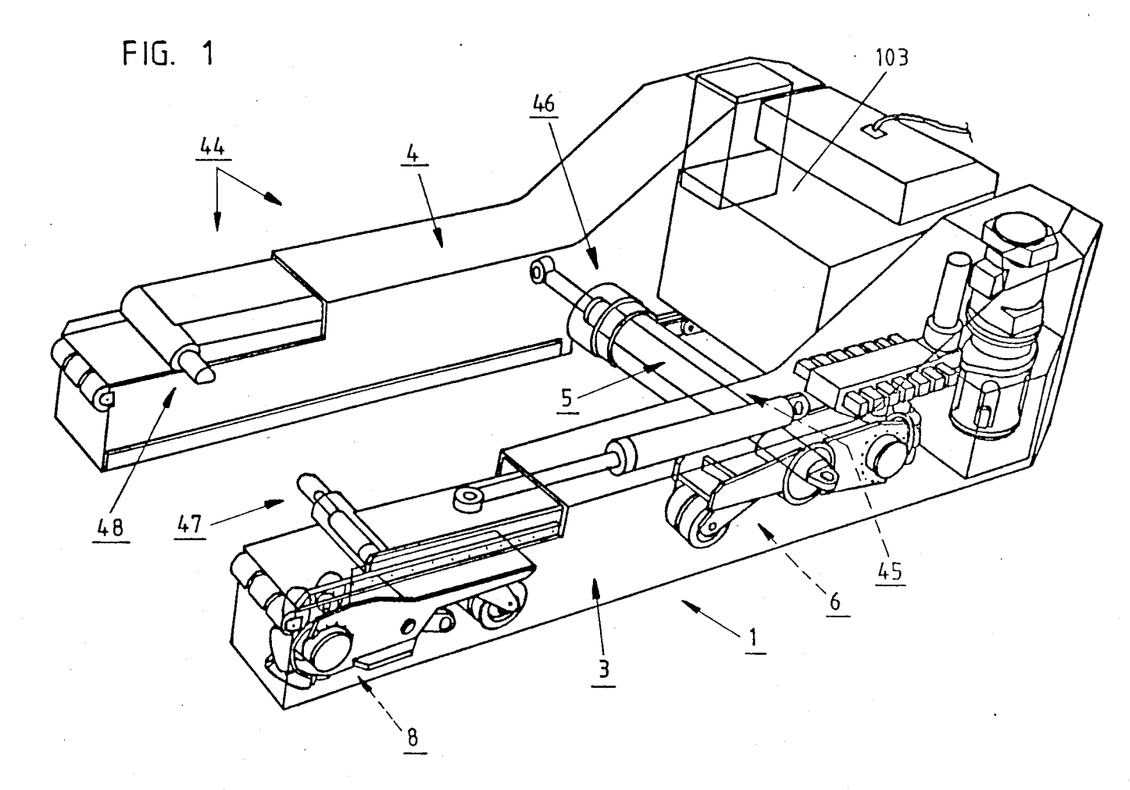
FIG. 1 is a perspective view of a transportation device according to the invention.
Figure 2:
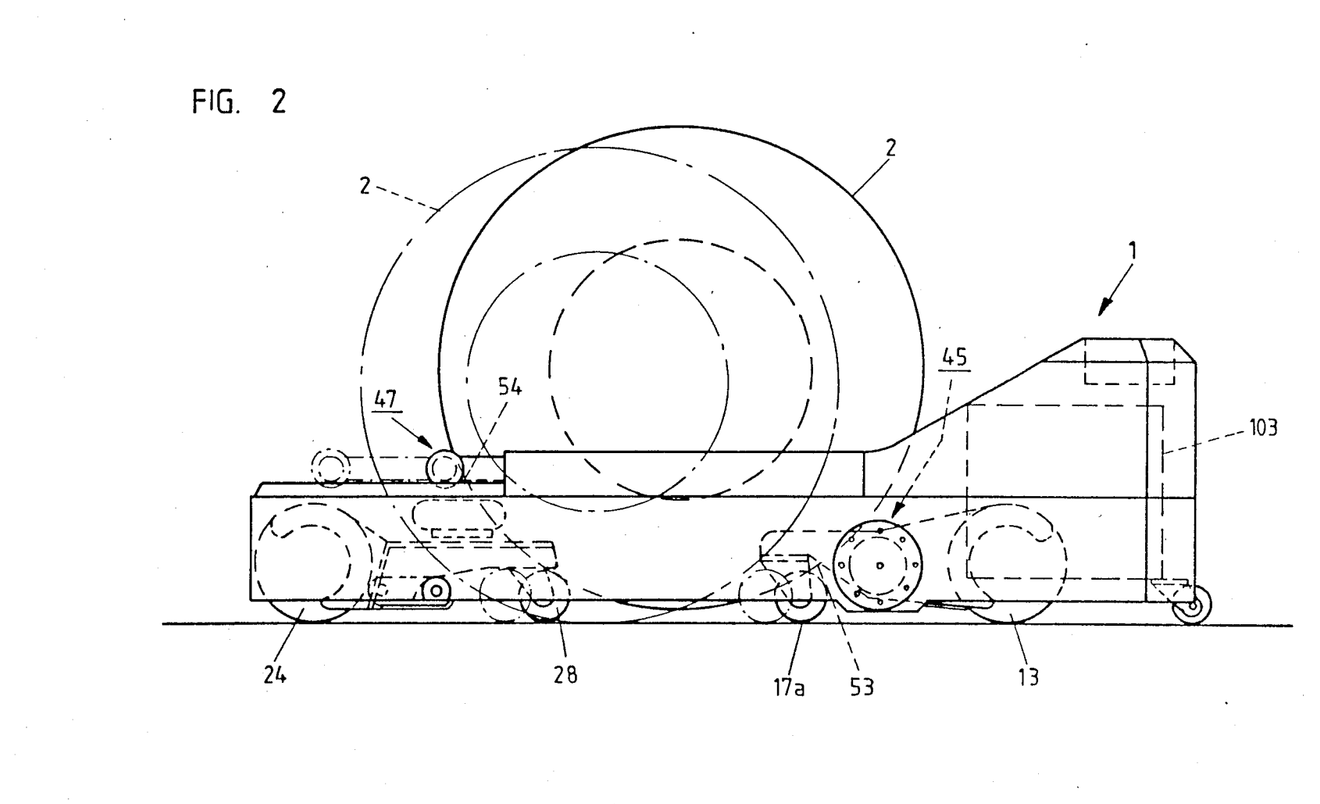
FIG. 2 is a side view of the transportation device.
Figure 3:
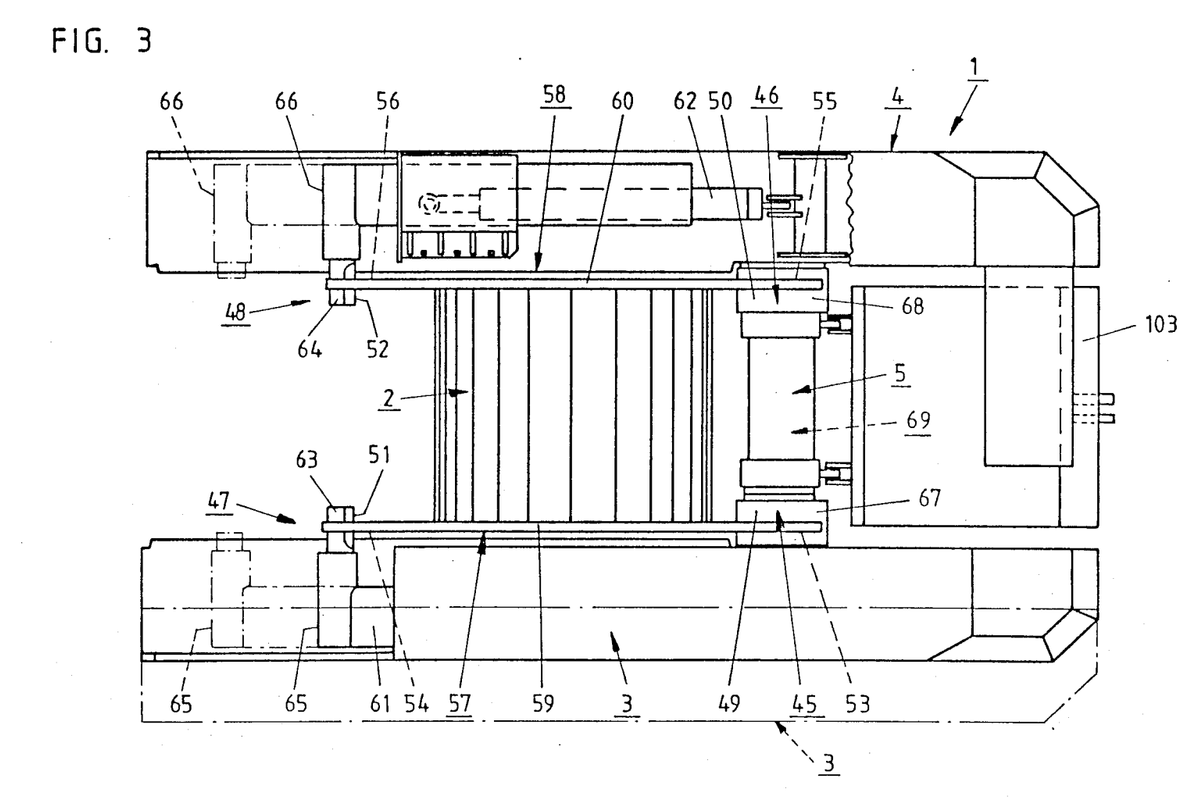
FIG. 3 is a plan view of the transportation device.
Figure 4:
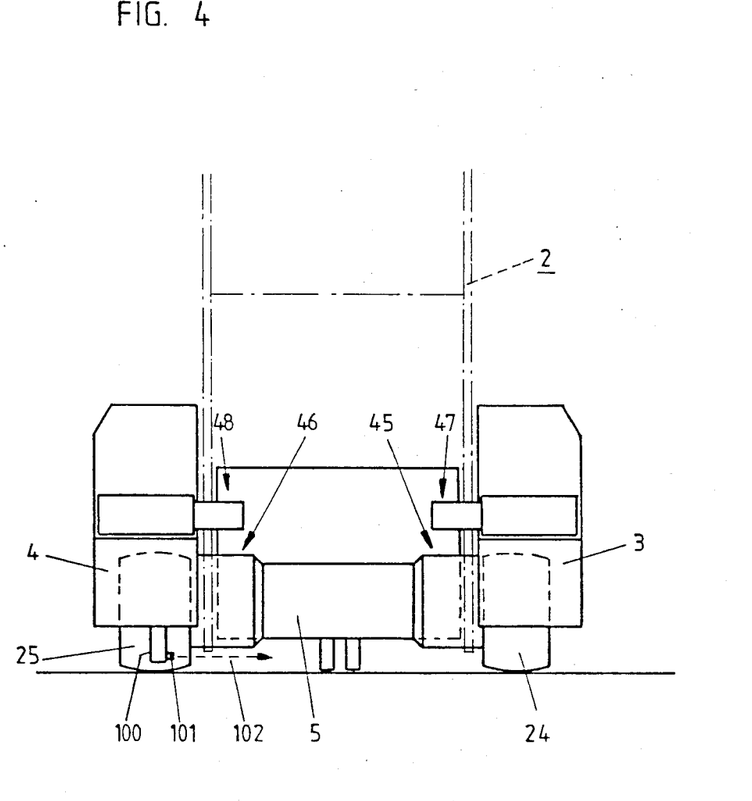
FIG. 4 illustrates the transportation device as seen from the rear.
Figure 5:
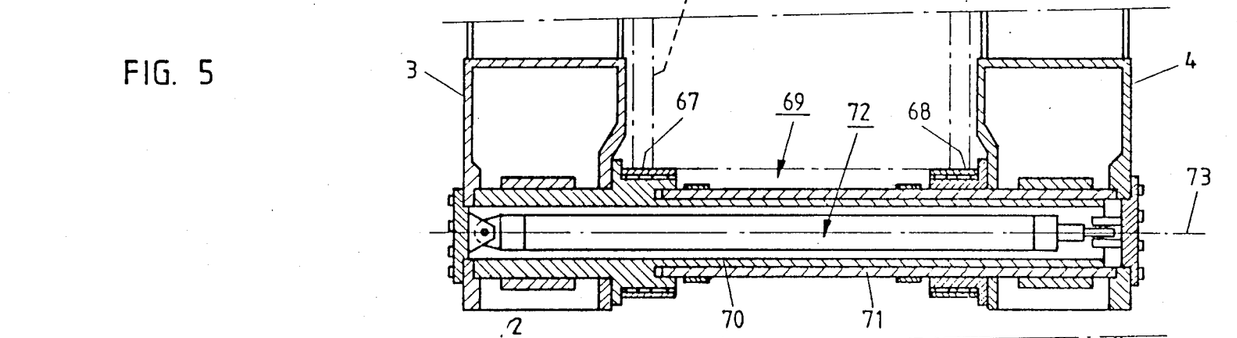
FIG. 5 is a section of a lateral shifting device comprised in the transportation device.
Figure 6:
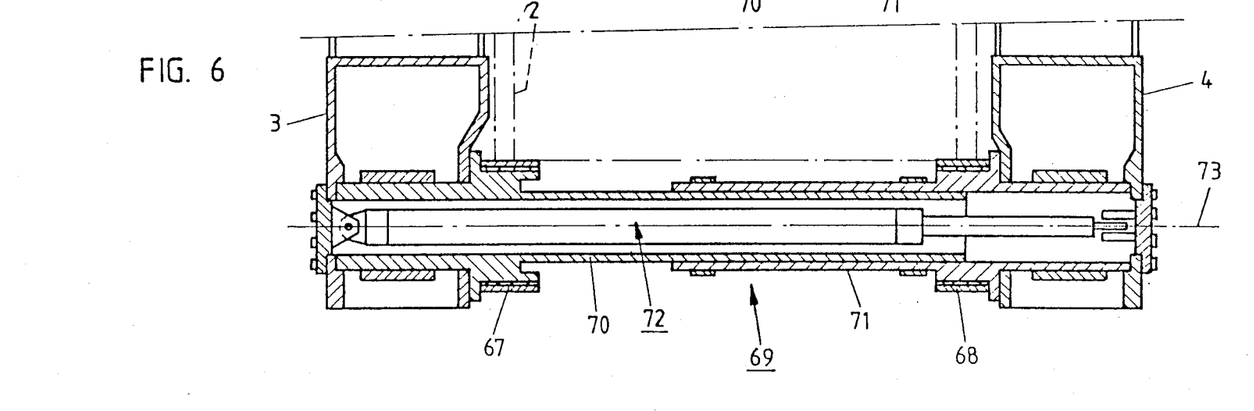
FIG. 6 illustrates the lateral shifting device in another position.

In certain cases it may be suitable for some of the lifting means to be resilient and/or to possess high friction properties. To make this possible the front lifting means 45, 46 may preferably consist of or be provided with resilient material and their lifting surfaces 49, 50 may possess high friction properties. By the arrangement of the drive wheels 13, 24, 14, 25 on the frame parts 3 and 4 said parts may be adjusted in relation to each other for variation of the width of the "gap" between them, i.e. for adjustment of the carrier 1 with regard to cable drums of various widths. The movement of the frame parts can be brought about by driving solely the drive wheels 13, 24 and 14, 25, or by driving the drive wheels 13, 24 and 14, 25 in conjunction with a lateral shifting device 69. In the latter case, the drive wheels 13, 24 and 14, 25 may assist one another, or possibly the drive wheels 13, 24 and 14, 25 may be disengaged such that the lateral shifting device 69 performs the entire lateral shifting work. In the embodiment illustrated the drive wheels 13, 24 and 14, 25 cooperate with the lateral shifting device 69 which constitutes the transverse frame part 5. The lateral shifting movement of the lateral shifting device 69 may depend on the rotational movements of one or more of the drive wheels 13, 24 and 14, 25 so that the best possible coaction is obtained between the movements of the drive wheels and the frame parts. The rate of lateral shift of the lateral shifting device 69 is preferably synchronized with the speeds of rotation of one or more of the drive wheels 13, 24 and/or 14, 25. As is apparent from FIGS. 5 and 6, the lateral shifting device 69 consists of telescopically interconnected two linear bearings 70, 71 and an actuation assembly 72 disposed therein and having the form of a cylinder and piston unit. In the illustrated embodiment, one linear bearing 70 is mounted on the longitudinal frame part 3, while the other linear bearing 71 is mounted on the longitudinal frame part 4. The cylinder and piston unit of the actuation assembly 72 has its cylinder mounted on the longitudinal frame part 3, while its piston is mounted on the longitudinal frame part 4. In the position shown in FIG. 5, the lateral shifting device 69 is contracted for adaptation of the frame parts 3, 4 to a narrow cable drum 2, while FIG. 6 shows the lateral shifting device 69 in a more protracted position for adaptation of the frame parts 3, 4 to a wider cable drum 2.

The actuation assembly 72 at the same time constitutes a retaining mechanism for retaining the frame parts 3, 4 in the positions to which they have been moved. Alternatively, the retaining mechanism may be a separate means (not shown) which preferably cooperates with the lateral shifting device 69.

The axis 73 of the lateral shifting device 69 preferably coincides with the axis of the transverse frame part 5 and thus with the truck journals 10, 11.

Figure 10:
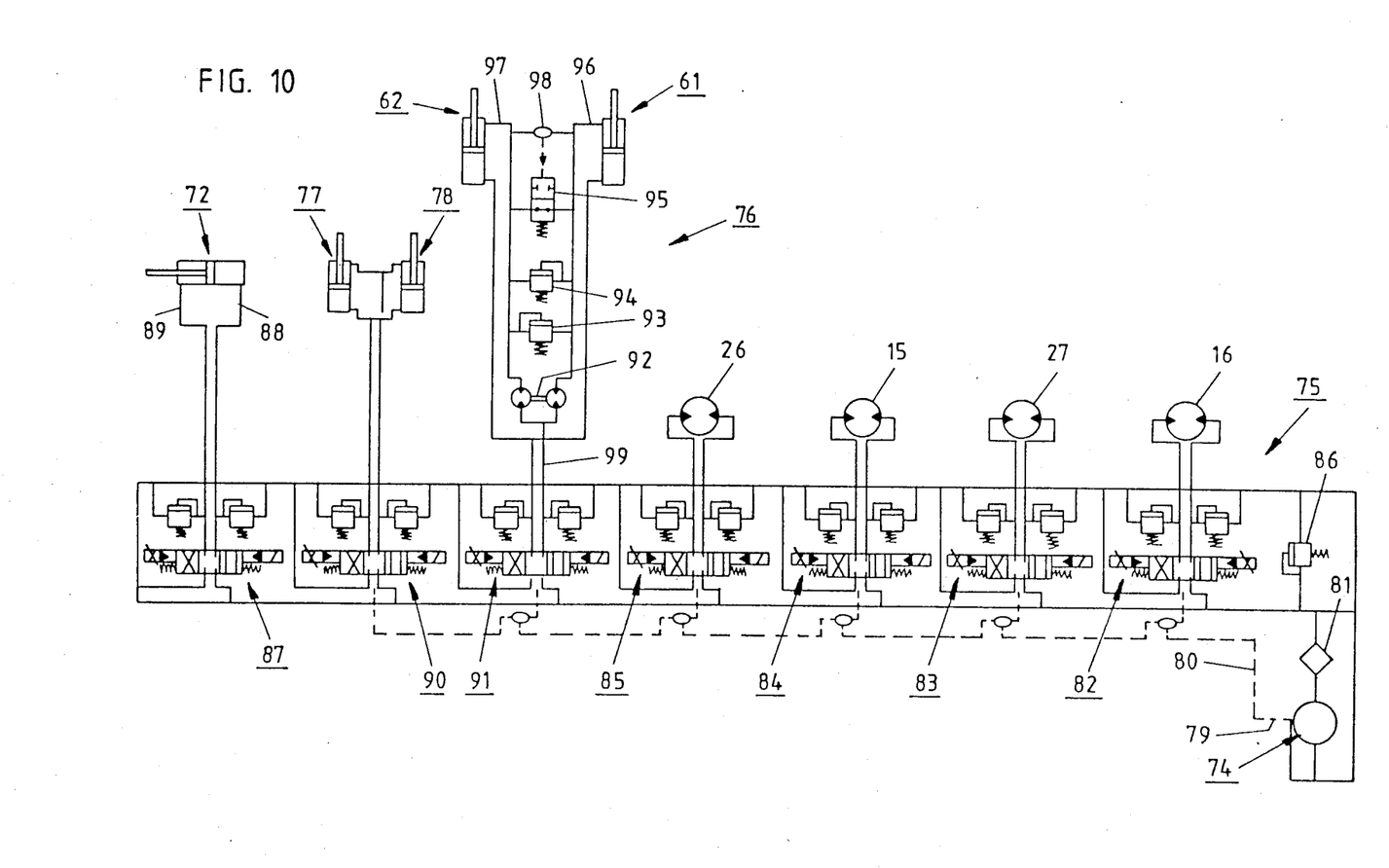
FIG. 10 is a hydraulics diagram of the hydraulic system of the transportation device.

The hydraulic system includes a variable pump 74, a directional valve unit 75, a parallel motion equipment 76 for parallel movement of the cylinder and piston units 61, 62 of the lifting means 47, 48, the actuation assembly 72 of the lateral shifting device 69 and the cylinder and piston units 77, 78 adapted to move the pin-like elements 63, 64. The hydraulic system furthermore comprises the drives 15, 16, 26 and 27 of the drive wheels 13, 14, 24 and 25. The pump 74 has control means 79 which regulate the operating pressure of the pump to a level corresponding to the signal pressure emitted by the directional valve unit 75 in a line 80 plus the pressure drop in the conduits and directional valves.

The discharge of the pump 74 flows via pressure filter 81 to the directional valve unit 75 which consists of directional valves 82, 83, 84, 85, 87, 90, 91 in sections and a main pressure limiting valve. The directional valves are electrically controlled and proportionally volume-regulated.

A directional valve 87 which controls the actuation assembly 72 for the lateral displacement movement is devoid of an output load sensing signal and cannot therefore influence the operating pressure of the pump 74.

When the transportation device 1 is to be made broader by movement of the left-hand longitudinal frame part 4 to the left, the following takes place:

The drives 16, 27 for the drive wheels 14, 25 of the left-hand longitudinal frame part 4 are caused to rotate forwards or backwards by activation of the valves 82 and 83. A load signal of the current operating pressure is sent to the pump regulator 79 and the pump 74 develops the requisite operating pressure. At the same time the directional valve 87 is connected to the actuation assembly 72 via the connection 88 thereof, which results in that the actuation assembly 72 causes the lateral shifting device 69 to be broadened. When the drives 16, 27 demand an increasing pressure, the operating pressure of the pump 74 will thus also increase because of the pump regulator 79, and the actuation assembly 72 is driven at a higher pressure resulting in a greater force which reduces the resistance of the wheel drives 16, 27. The pressure decreases and is stabilized at a level where the drives 16, 27 and the actuation assembly 72 is driven with the same pressure and speed ratio, where the speed is dependent on the discharge from the directional valves 82, 83. On broadening and narrowing, respectively, the directional valves 82, 83 can be controlled for a given flow; the speed or speeds of the movements cannot then be influenced by the driver of the carrier 1 but this implies simpler maneuvering.

The longitudinal frame parts 3, 4 of the carrier 1 can be laterally displaced in other combinations; thus it may for instance be made narrower in that the left-hand frame part 4 is moved to the right. To realize this, the directional valves 82, 83 are operated in such a way that the drives 16, 27 are caused to rotate in such directions that the left-hand frame part 4 is driven to the right. At the same time the directional valve 87 is connected, sending pressure oil to the connection 89 of the lateral shifting assembly 72, whereby the lateral shifting assembly 72 contracts.

In the same way the directional valves 84, 85 are operated for broadening and narrowing, respectively, in that the right-hand longitudinal frame part 3 is laterally displaced with the aid of the drive wheels 13, 34 via the drive 15, 26 thereof, combined with an actuation of the directional valve 87 for simultaneous operation of the actuation assembly 72.

Broadening and narrowing, respectively, of the carrier 1 can also be effected by shifting the two longitudinal frame parts 3, 4 in relation to one another and the base at the same time. To perform such a broadening the directional valves 82, 83 are operated so as to drive the drives 16, 27 of the left-hand frame part 4 and thus the drive wheels 14, 25 thereof in such directions that the frame part 4 passes to the left simultaneously as the directional valves 84, 85 are operated so as to drive the drives 15, 26 of the right-hand longitudinal frame part 3 and thus the drive wheels 13, 24 thereof in such directions that the frame part 4 passes to the right, while the directional valve 87 is connected so as to send pressure oil to the connection 88 of the lateral shifting assembly 72. Narrowing by simultaneous shifting of the two frame parts. 3, 4 in relation to one another and to the base takes place with the aid of the same valves. They are then operated into positions opposite to the operating positions for broadening, and the drives 16, 27, 15, 26 and thus their drive wheels 13, 24, 14, 25 as well as the lateral shifting assembly 72 assume opposite driving directions.

Regualtion of the cylinder and piston units 77, 78 for outward and inward shifting of the pin-like elements 63, 64 is brought about by connection of a directional valve 90 which sends pressure oil to the cylinder and piston units 77, 78.

The cylinder and piston units 61, 62 for the longitudinal movements of the lifting means 47, 48 are driven under the control of a directional valve 91.

The lines between the directional valve 91 and the cylinder and piston units 61, 62 comprise a flow divider 92, two pressure limiting valves 93, 94 and a two-way valve 95 having an open and a closed position. One is normally open but is closed when a certain pressure level has been reached in its pilot connection. The pilot pressure is influenced by the pressure in either of the connections 96, 97 and is led to the pilot connection via an alternative valve 98. When the lifting movement is initiated the directional valve 91 is connected so that the pressure oil flows via the line 99 to the flow divider 92 and continues to the respective cylinder connections 96, 97. The two-way valve 95 which is then open, permits the piston and cylinder units 61, 62 with the respective lifting means 47, 48 individually to approach the cable drum 2 irrespective of its original position, and the lifting means 47, 48 can come into application with the peripheries 59, 60 of the cable drum end walls 57, 58 regardless of whether said peripheries 59, 60 are unsymmetrical in and per se or unsymmetrically positioned relative to one another. When the cable drum 2 has come in contact with all lifting means 45, 46, 47, 48 the pressure increases since lifting is then initiated. With this pressure increase the two-way valve 95 reverses into closed position. The lines between the flow divider 92 and the respective cylinder and piston unit 61, 62 are then separated from each other and the cylinder and piston units 61, 62 operate in parallel. If the cable drum 2 is unround one of the lifting means 47, 48 loses its contact with the cable drum 2. The load is then transferred to the other of the lifting means 47, 48 and the pressure in its cylinder connection increases. At such a pressure increase which exceeds the permissible one, one of the pressure limiting valves 93, 94 is opened and lets oil escape to the cylinder relieved of load, which results in a movement equalization that reestabilishes contact of one of the lifting means 47, 48 with the cable drum 2. When the cable drum 2 has reached the requisite lifting height the directional valve 91 changes over into neutral position and the cable drum 2 remains in the raised position. Upon lowering of the cable drum the movement takes place in the reverse order and the cylinder and piston units 61, 62 operate in parallel until the pressure decreases and the two-way valve 95 changes over into open position.

Figure 11:
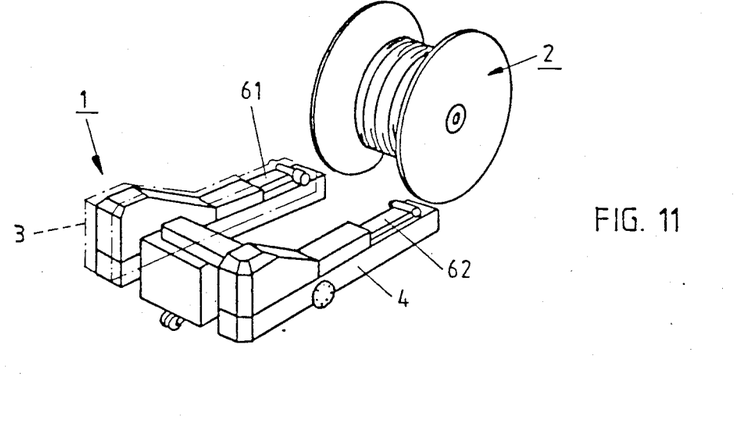
FIGS. 11–13 illustrate various phases of the pick-up of a cable drum for transportation.
Figure 12:
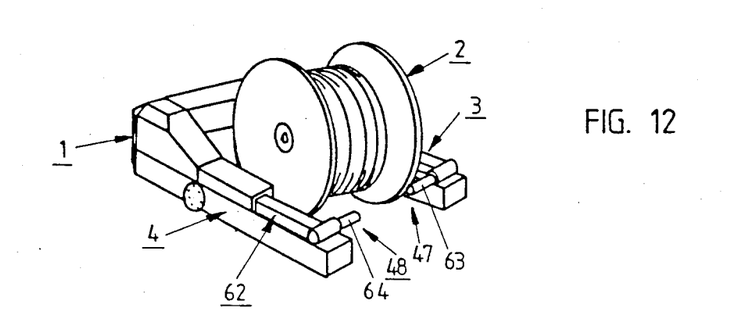
Figure 13:
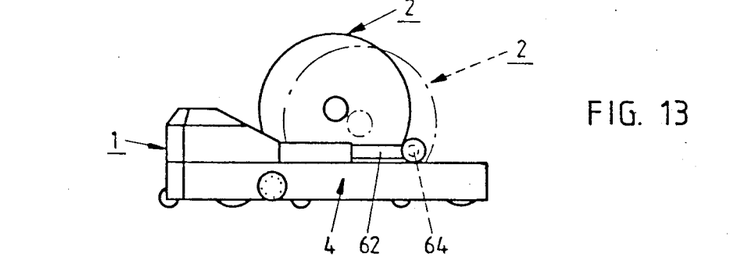

The operation of the carrier 1 is described with reference to FIGS. 11–13. In FIG. 11 there is shown a carrier 1 which has been driven up to the cable drum 2 to be lifted and transported. If the "gap" between the frame parts 3, 4 is too narrow for enabling the carrier to straddle the cable drum 2, said "gap" must be broadened in that the drive wheels 13, 24 and/or 14, 25 and the lateral shifting device 69 move one frame part 3 or 4 outwards or both frame parts 3, 4 away from one another. In the device illustrated this takes place by one frame part 3 being moved both by actuation of the lateral shifting device 69 and by actuation of the drive wheels 13 and 24 of the frame part 3 (viz. in that these drive wheels 13, 24 are driven for lateral shifting). Correspondingly, the other frame part 4 can be moved by actuation of both the lateral shifting device 69 and the drive wheels 14, 25 of the frame part 4 (viz. in that the drive wheels 13, 25 are driven for lateral shifting). Alternatively, both frame parts 3, 4 can be simultaneously displaced laterally by actuation of both the shifting device 69 and the drive wheels 13, 24, 14, 25 of the frame parts 3, 4.

Lateral shifting of one or both frame parts 3, 4 by cooperation between the lateral shifting device 69 and the drive wheels 13, 24, 14, 25 may in certain cases be effected in such a way that the entire lateral shifting force is generated with the aid of the lateral shifting device 69, while the respective drive wheels 13, 24 and/or 14, 25 are disengaged in order not to prevent the lateral shifting movement. In the case illustrated, for example, it is suitable to move only the frame part 3 from the position shown by full lines to the position indicated by dash and dot lines. The frame parts 3, 4 have then been moved from a position more exactly appearing from FIGS. 5 to a position more exactly appearing from FIG. 6.

In this case, the frame part 4 need not be laterally moved because it already occupies a suitable position in relation to one end wall 57 of the cable drum 2. When the "gap" between the frame parts 3, 4 is sufficiently large the frame parts 3, 4 are retained in their positions with the aid of the assembly 72 so that the frame parts 3, 4 do not move relative to each other when the carrier 1 is propelled. After that, the carrier 1 is driven towards the cable drum 2 until the carrier 1 straddles it and until the cable drum 2 bears against the front lifting means 45, 46 of the lifting unit 44 on the lateral displacement device 69.

Thereafter the pin-like elements 63, 64 of the rear lifting means 47, 48 are moved some distance inwards until said elements 63, 64 will lie directly behind the end wall sides 57, 58 of the cable drum 2. The cable drum 2 and the pin-like elements 63, 64 then take a position that appears from FIG. 12.

The lifting unit 44 can then raise the cable drum 2 from the base. This takes place by contraction of its cylinder and piston units 61, 62, which implies that the rear lifting means 47, 48 are moved forwardly towards the cable drum 2 from the position according to FIG. 12 or from the position indicated by dash and dot lines in FIG. 3.

When the lifting means 47, 48 reach the end wall sides 57, 58 of the cable drum 2 the parallel motion device 76 sees to it that the lifting means 47, 48 adapt themselves to the end wall sides 57, 58 so that these bear against all four lifting means 45, 46, 47, 48. This implies for instance that the lifting means 47 is advanced farther than the lifting means 48 and establishes contact with the periphery 59 of the end wall side 57 even though the end wall side 57 has a somewhat smaller diameter than that of the end wall side 58 or even though the periphery 59 of the end wall side 57 is depressed opposite the lifting means 47.

As the obliquely upwardly directed opposed lifting surfaces 49, 50, 51, 52 of the lifting means 47, 48 bear against the obliquely downwardly directed remote engagement surfaces 53, 55, 54, 56 of the peripheries 59, 60 of the end wall sides 57, 58 and the movements of the lifting means 47, 48 in the forward direction are continued, the cable drum 2 will be urged upwards from the base to a transport position in which it is maintained by the lifting means 45, 46, 47, 48 during transport. This is illustrated in FIG. 13 where the cable drum 2 has been indicated by dash and dot lines before lifting is performed and by full lines after lifting has been performed.

In principle, lifting of the cable drum 2 is realized in that the cable drum 2 cannot move in any direction other than in the upward direction when the lifting means 45, 46, 47, 48 approach each other after they have established contact with the cable drum 2. The actual guiding of the drum in the upward direction is obtained in that the lifting surfaces 49, 50, 51, 52 are directed in the manner described. The front lifting means 45, 46 are able to roll during the lifting proper, whereby the cable drum 2 need not slide on them.

The parallel motion equipment 76 also brings about that the lifting means 47, 48 are moved in parallel in order to maintain, during lifting and after lifting has been performed, the cable drum 2 in the contemplated position, that is to say for instance with its end wall sides 57, 58 in parallel or fairly in parallel with the frame parts 3, 4.

An indicating device 100 (see FIG. 4) controls the movement of the cylinder and piston units 61, 62 in such a way that the lifting movement is interrupted when the cable drum 2 has been raised to a suitable height. The indicating device 100 may be of the type of indicators which operate with a photoelectric cell 101 sensing by means of signals 102 when the cable drum 2 has passed a certain level during the lifting movement.

Lowering of the cable drum 2 takes place in that the cylinder and piston units 61, 62 again move the rear lifting means 47, 48 rearwardly so that their distance to the front lifting means 45, 46 increases until the cable drum 2 again is in position on the base.

The carrier 1 can be used for other purposes than the lifting and transport of cable drums 2, for instance for the lifting and transport of containers which have corresponding engagement portions. The lifting assembly proper 44 can be designed in many different ways: There may be for instance one, a pair or another number of lifting means on each side of the object to be lifted, and these lifting means may be stationary or movable. As an example, the grasping movement which implies that at least one or a pair of the lifting means are brought into lifting position adjacent the object, may wholly or partly be brought about by the lateral shifting movement of the frame parts. This implies that for instance the rear lifting means 47, 48 need not have any inwardly movable elements or need have elements inwardly movable only to a restricted extent, since the requisite movement of the lifting means inwardly or outwardly can be realized by moving the frame parts inwardly or outwardly. Movable lifting means 45, 46 of a kind other than the rotatable elements 67, 68 arranged on the frame part 5 may also be utilized. The lifting means may on the whole vary within broad limits with regard to their shape, location and number, all in dependence on the type of objects to be lifted and transported. The lifting surfaces of the lifting means may be provided with resilient material in order not to damage the object to be lifted, and/or the lifting surfaces may present material having a high friction coefficient to preclude sliding between the lifting means and the object to be transported.

The frame parts 3, 4 may directly or indirectly constitute movable clamping means to retain an interleaved object during transport, the clamping being wholly or partly brought about and retained with the aid of the lateral displacement device.

The lateral shifting device 69 may be of another type than that shown, and may consist of or comprise more than one power unit, for instance one power unit for each frame part. The lateral shifting movement of the lateral shifting device may be dependent on the rotary movements of a suitable number of drive wheels and said dependency may comprise the entire shifting movement or but parts thereof. The shifting speed of the lateral shifting device 69 is preferably synchronized with the speed of rotation of one or more of the drive wheels.

The lifting means 47, 48 of the frame parts 3, 4 or other components (not shown) on said parts 3, 4 may form lifting and/or pushing means which are adjustable into operational positions for lifting and/or pushing the cable drum 2 wholly or partly by moving the frame parts 3, 4 in relation to each other. As a result, the frame parts 3, 4 can be moved so as to grasp the cable drum 2 for the purpose of lifting it from the base and/or pushing it along the base.

In lieu of drive wheels, the carrier 1 may have endless tracks or other suitable drive means with rollers or other suitable ground contact elements which are adapted to permit propulsion in an optional direction. The drive wheels or corresponding members may be disposed on the carrier by the intermediary of truck units or directly without any truck units.

The operating system or systems for operating the various units may for example be electric instead of hydraulic. Alternatively propulsion or steering may be brought about by a combination of electric and hydraulic operation, or otherwise.

The transportation device or carrier 1 according to the invention is useful for transportation in many different fields, and as will appear from the above description, it may be designed in various ways within the scope of the inventive idea. Many different attachments are also conceivable: For example a load-supporting trailer 103 for say batteries may be coupled to the carrier, preferably to the transverse frame part 5 thereof. This trailer may have batteries for the operation of control or other systems or carry other suitable load, and it may preferably be pivotally or detachably connected to the lateral shifting device and have one or more drive wheels.

In certain cases, it may suffice if one of the frame parts 3, 4 is movable while the other is stationary. If the frame parts 3, 4 are shifted altogether by means of a lateral shifting device or in cooperation between the drive wheels and a lateral shifting device, said lateral shifting device may alternatively consist of several shifting devices e.g. one for each frame part. The retaining means for retaining the frame parts in their positions may consist of one or more retaining assemblies, such as one retaining assembly for each frame part, and the retaining means need not consist of, be combined or cooperate with the lateral shifting device. Instead of the lateral shifting function, the lateral shifting device illustrated in the drawings may be endowed with a retaining function only.

Also the number of drive wheels 13, 24, 14, 25 per frame part 3 and/or 4 may vary. Thus each frame part 3 and/or 4 may have one, two, three, four or any other suitable number of drive wheels 13, 24, 14, 25, and the carrier 1 may optionally be provided with drive wheels 13, 24, 14, 25 at other points than at movable frame parts. The movable frame part or parts may be designed and disposed in a manner other than that described in the foregoing and shown in the drawings.

The frame part or parts 3 and/or 4 movable in the above-described manner may be movable in order to facilitate straddling of one or more objects which are to be, say, transported in engagement with the base or lifted and transported in a lifted state. However, the frame parts may be movable for other purposes, such as for grasping, maintaining, or pushing objects in relation to the base or for moving objects in relation to other parts of the frame of the carrier.

What I claim is

1. A transportation device for picking up and transporting objects, particularly cable drums, and comprising first and second longitudinal frame parts extending parallel to each other in a spaced relationship;
    an adjustable transverse frame part extending perpendicularly to said first and said second frame parts and interconnecting them;
    each of said first and second frame parts comprising drive means including obliquely positioned ground contact elements adapted to drive the transportation device in any desired direction and means operatively connected to said ground contact elements for driving the same, and lifting means mounted at each of said first and second frame parts and extending into the space between said first and second frame parts for picking up and lifting an object received in the space between said first and second frame parts;
    means for displacing at least one of said first and second frame parts relative to the other of said first and second frame parts in a direction parallel to said transverse frame part to adjust the distance between said first and second frame parts to thereby adjust the distance between said lifting means;
    and wherein said means for displacing being actuated in response to actuation of the drive means associated with a respective one of said first and second frame parts.

2. A transportation device according to claim 1 wherein said means for driving said ground contact elements is individually operated to enable each of said first and second frame parts to be individually displaced relative to each other.

3. A transportation device according to claim 2 wherein said adjustable transverse frame part comprises said displacing means.

4. A transportation device according to claim 1, 2 or 3 wherein said first and second frame parts transport the object by retaining it therebetween.

5. A transportation device according to claim 1 wherein said lifting means is mounted on said first and second frame parts for displacement in a longitudinal direction thereof.

6. A transportation device according to claim 1 wherein said displacing means comprises an actuation and retaining assembly for retaining a respective frame part after it has been moved to a predetermined position in a predetermined relation to the other frame part.

7. A transportation device according to claim 6 wherein said first and second frame parts clamp the object therebetween, the clamping force being provided at least partially by said actuation and retaining assembly.

8. A transportation device according to claim 1 wherein the operation of said displacing means is synchronized with the speed of movement of said drive means.

9. A transportation device according to claim 1 wherein each of said ground contact elements comprises one pair of drive wheels.

10. A transportation device according to claim 1 wherein said displacing means comprises two telescopically interconnected linear bearings connected with said first and second frame parts, respectively, and an actuation and retaining assembly disposed between and connected to said first and second frame parts for shifting said bearings.

11. A transportation device according to claim 10 wherein the linear bearings support the object which is carried by said transportation device.

12. A transportation device according to claim 11 wherein said displacing means comprises an actuation and retaining assembly for actuating the same, said actuation and retaining assembly including a fluid cylinder means and a control valve for controlling operation of said fluid cylinder means.

13. A transportation device according to claim 12 wherein said control valve of said displacing means is actuated in response to actuation of the valve means in said drive means.

14. A transportation device according to claim 1 wherein said means for driving said ground contact elements comprises fluid motor means and valve means for controlling operation of said fluid motor means.

* * * * *